(12) United States Patent
Malamut et al.

(10) Patent No.: US 11,461,180 B2
(45) Date of Patent: Oct. 4, 2022

(54) OPTIMIZED DOCUMENT BACKUP TO CLOUD-BASED OBJECT STORE

(71) Applicant: EMC IP Holding Company LLC, Hopkinton, MA (US)

(72) Inventors: Mark Malamut, Aliso Viejo, CA (US); Adam Brenner, Mission Viejo, CA (US); Arun Murti, Mission Viejo, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 104 days.

(21) Appl. No.: 17/024,254

(22) Filed: Sep. 17, 2020

(65) Prior Publication Data

US 2022/0083427 A1    Mar. 17, 2022

(51) Int. Cl.
*G06F 12/00* (2006.01)
*G06F 11/14* (2006.01)

(52) U.S. Cl.
CPC ...... *G06F 11/1451* (2013.01); *G06F 11/1461* (2013.01); *G06F 11/1464* (2013.01); *G06F 11/1469* (2013.01); *G06F 11/1484* (2013.01)

(58) Field of Classification Search
CPC ............. G06F 11/1451; G06F 11/1461; G06F 11/1464; G06F 11/1469; G06F 11/1484; G06F 3/065; G06F 3/0689
See application file for complete search history.

(56) References Cited

U.S. PATENT DOCUMENTS 7,818,535 B1 * 10/2010 Bono .................... G06F 3/0619
711/173

\* cited by examiner

*Primary Examiner* — Shawn X Gu
(74) *Attorney, Agent, or Firm* — Staniford Tomita LLP

(57) ABSTRACT

Storing documents in an object store in the cloud by creating a container for the documents, defining a document record including unique document ID and an index. A backup record for every backup includes a timestamp for each backup, and a bitmask for each document in the container has a single bit position for each document to indicate the corresponding document as unchanged or that it has been changed/deleted. Each bit location in the bitmask is referenced by the index in the document record. Large documents have a multi-part record identifying the containers. During point-in-time recovery, containers that match a given timestamp are found, and documents where the bitmask bit is set are restored.

18 Claims, 8 Drawing Sheets

```
                                    200
                                      ↘

┌─────────────────────────────────────────┐
          │  CREATE WRITE-ONCE CONTAINER OBJECT IN  │
          │             OBJECT STORE                │
          │                  202                    │
          └─────────────────────────────────────────┘
                              │
                              ▼
          ┌─────────────────────────────────────────┐
          │   GROUP DOCUMENTS TO BE STORED IN A     │
          │              CONTAINER                  │
          │                  204                    │
          └─────────────────────────────────────────┘
                              │
                              ▼
          ┌─────────────────────────────────────────┐
          │   DEFINE DOCUMENT RECORD FOR EACH       │
          │   DOCUMENT INCLUDING UNIQUE DOCUMENT    │
          │             ID AND INDEX                │
          │                  206                    │
          └─────────────────────────────────────────┘
                              │
                              ▼
          ┌─────────────────────────────────────────┐
          │   DEFINE BACKUP RECORD OF CONTAINER     │
          │   WITH TIMESTAMP AND BITMASK OF EACH    │
          │          DOCUMENT IN CONTAINER          │
          │                  208                    │
          └─────────────────────────────────────────┘
                              │
                              ▼
          ┌─────────────────────────────────────────┐
          │  SET BACKUP RECORD BITMASK TO INDICATE  │
          │  DOCUMENTS IN CONTAINER CHANGED FOR     │
          │                BACKUP                   │
          │                  210                    │
          └─────────────────────────────────────────┘
                              │
                              ▼
          ┌─────────────────────────────────────────┐
          │  FOR PIT RECOVERY, FIND CONTAINERS      │
          │  FROM BACKUP RECORD THAT MATCHES        │
          │            GIVEN TIMESTAMP              │
          │                  212                    │
          └─────────────────────────────────────────┘
                              │
                              ▼
          ┌─────────────────────────────────────────┐
          │   RESTORE DOCUMENT IN EACH CONTAINER    │
          │        WHERE BITMASK BIT IS SET         │
          │                  214                    │
          └─────────────────────────────────────────┘
```

FIG. 2

| Object Name | Nids | IdData | 400 | Data |
|---|---|---|---|---|
| john47.container-1 | 5 | (0, 22), (22, 34), (56, 26), (82, 36), (118, 42) | | Document [1], [12], [33], [14], [5] |
| john47.container-2 | 4 | (0, 82), (82, 72), (154, 10), (164, 20) | | Document [26], [32], [39], [17] |
| john47.container-3 | 2 | (p, q), (r, s) | | Document [10], [33] |
| John47.container-4 | 1 | (t, u) | | Document [51] |
| John47.container-5 | 1 | (v, w) | | Document [51] |

FIG. 4

| DRid | CDid | Full Path 500 | Start Date | End Date | Index | MultiPart |
|---|---|---|---|---|---|---|
| 1 | 1 | C:\path1\info.pptx | 1/1/2012 | | 0 | N |
| 12 | 1 | C:\path1\list.docx | 1/1/2012 | | 1 | N |
| 33 | 1 | C:\path2\info.accdb | 1/1/2012 | 1/2/2012 | 2 | N |
| 14 | 1 | C:\path1\cars.xlsx | 1/1/2012 | 1/1/2012 | 3 | N |
| 5 | 1 | C:\path1\smb.pptx | 1/1/2012 | | 4 | N |
| 26 | 2 | C:\path1\enterprise.pptx | 1/2/2012 | | 0 | N |
| 32 | 2 | C:\path1\federal.pptx | 1/2/2012 | | 1 | N |
| 39 | 2 | C:\path1\federal.docx | 1/2/2012 | | 2 | N |
| 17 | 2 | C:\path1\awsCost.xlsx | 1/2/2012 | | 3 | N |
| 10 | 3 | C:\path1\AzureCost.xlsx | 1/3/2012 | | 0 | N |
| 33 | 3 | C:\Documents\cloud.accdb | 1/3/2012 | | 1 | N |
| 51 | 4 | C:\Documents\codes.accdb | 1/3/2012 | | 0 | Y |

| CDid | Tier | LastAccess |
|---|---|---|
| 1 | COLD | 1/23/2019 |
| 2 | WARM | 7/14/2019 |
| 3 | HOT | 8/20/2019 |

| timestamp | Vmask | CDid |
|---|---|---|
| t0 | 11111 | 1 |
| t1 | 11101 | 1 |
| t1 | 1111 | 2 |
| t2 | 11001 | 1 |
| t2 | 1111 | 2 |
| t2 | 11 | 3 |
| t2 | 1 | 4 |
| t2 | 1 | 5 |

FIG. 7

OPTIMIZED DOCUMENT BACKUP TO CLOUD-BASED OBJECT STORE

TECHNICAL FIELD

This invention relates generally to cloud computing applications, and more specifically to systems and methods for optimizing document backups to object storage.

BACKGROUND OF THE INVENTION

Cloud computing provides a shared pool of configurable computing resources (e.g., computer networks, servers, storage, applications and services) that can be rapidly provisioned and released with minimal management effort. Cloud computing allows users with various capabilities to store and process their data in either a private cloud or public cloud (e.g., third-party owned cloud network) in order to make data accessing mechanisms easier and more reliable. Large-scale cloud computing infrastructure and services are often provided by cloud providers that maintain data centers that virtually consolidate vast computing resources such as storage and processing power.

Cloud computing platforms are often used to provide access to popular computer applications. Microsoft (MS) Office365 is an example of an online version popular desktop or server-based applications. MS Office365 is a version of the Microsoft Office suite that is hosted in a cloud network, and comprises applications such as word processors, spreadsheets, presentation programs, electronic mail (e-mail), and other similar productivity applications.

Data protection of applications such as those in the regular (i.e., native or offline) Microsoft Office suite has been available for many years. Until recently, this protection has primarily relied upon on-premise infrastructures. As these applications have also become available as cloud-based or pure Software-as-a-Service products (e.g., MS Office365), there is a need to offer back up and data protection of these applications under the SaaS model.

While protecting object-based document data, it is important that the overall solution be efficient from cost and performance perspectives. In order to support this, the storage, storage media and compute costs must be considered in addition to solution simplicity. In general, cloud-based storage resources that are significantly cheaper than cloud-based compute resources.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 2 is a flowchart illustrating an overall method of providing optimized document storage to cloud-based object storage, under some embodiments.

FIG. 4 is table that illustrates example entries of Container Data, under some embodiments.

FIG. 5 is a table that illustrates example entries of a Document Record, under some embodiments.

FIG. 6 is a table that illustrates example entries of a Container Record, under some embodiments.

FIG. 7 is a table that illustrates example entries of a Backup Record, under some embodiments.

DETAILED DESCRIPTION

Figure 1:
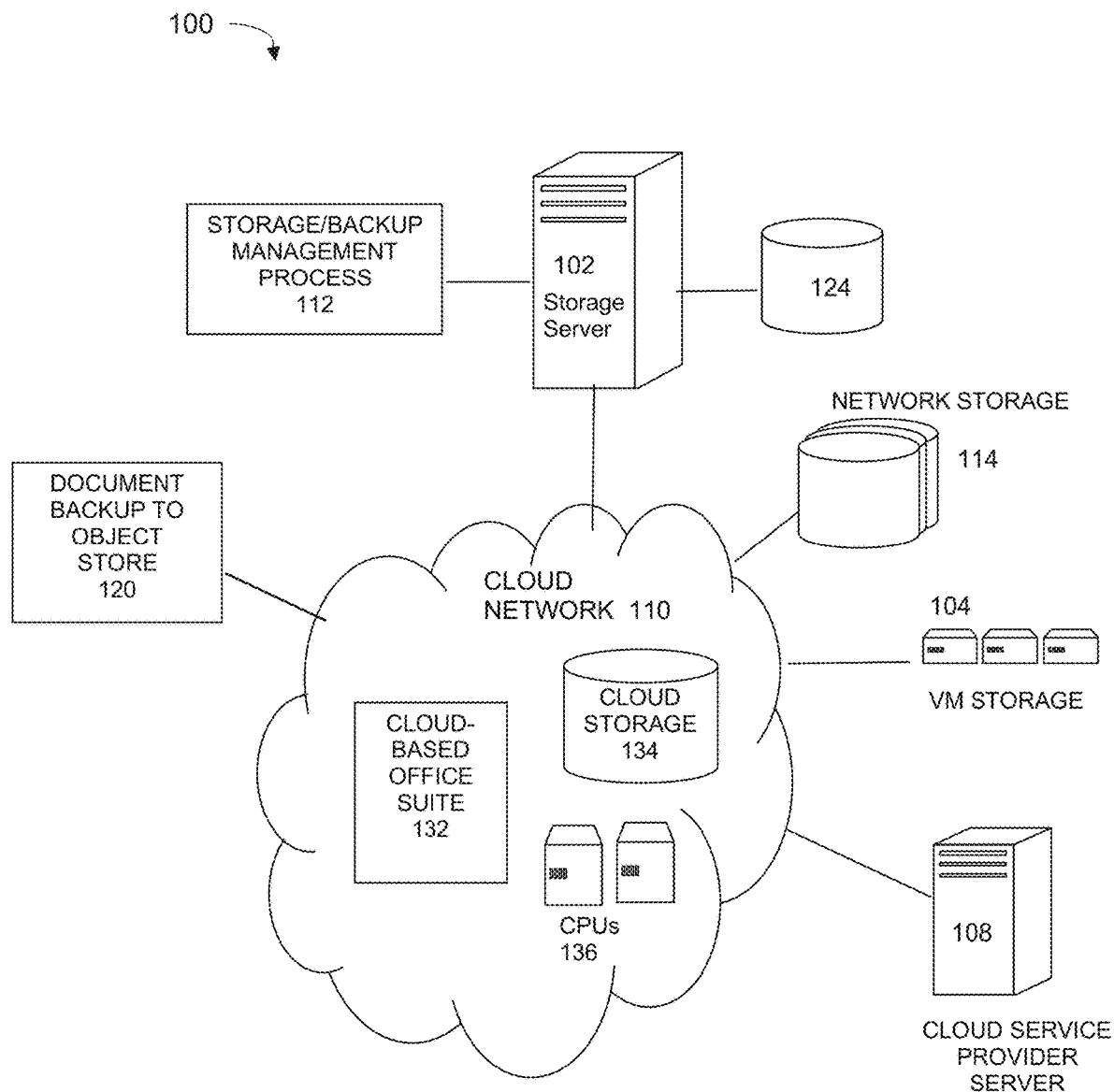
FIG. 1 is a diagram of a cloud computing network implementing an online application suite document data protection process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve data processing in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a cost-efficient model for the SaaS protection of documents and files (e.g., Word, Excel, PowerPoint) to the public cloud that considers the economics of the public cloud. As storage is typically cheaper than compute resources in the public cloud, such embodiments require minimal compute resources.

Although embodiments may be described with respect to the MS Office365 platform and Office365 documents, it should be noted that other similar cloud or SaaS-based program suites may also be used, and embodiments can be adapted to other document types and other data targets such as on-premises object storage. Likewise, though embodiments are directed to user application files and documents, embodiments are not so limited, and any appropriate application, application file types or data structures can also be used. Furthermore, although directed to public cloud environments, embodiments can also cover other data targets such as privately owned object storage target, on-premise object storage, or any other appropriate networked storage media.

FIG. 1 illustrates a computer network system that implements one or more embodiments of a cloud storage network system implementing a document backup to object store process, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, such as storage server 102 or other data source, in the network environment. The data sourced by the data source may be any appropriate data, such as database data that is part of a database management system, and the data may reside on one or more hard drives for the database(s) in a variety of formats.

The network server computers are coupled directly or indirectly to the data storage 114, target VMs 104, and the data sources and other resources through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

In an embodiment, cloud network 110 may be a private network or it may be a public network provided by a third-party cloud service provider 108 (CSP). In this case, at least part of the infrastructure of network 110, such as servers, routers, interfaces and so on are provided to users such as storage server 102 as an IaaS (Infrastructure as a Service), SaaS (Software as a Service), PaaS (Platform as a Service), or other type of arrangement. CSP's typically provide service under a service level agreement (SLA) that establishes the terms and costs to use the network and transmit/store data specifies minimum resource allocations (e.g., storage space) and performance requirements (e.g., network bandwidth) provided by the provider. The cloud service provider server 108 may maintained be any company such as Amazon, EMC, Apple, Cisco, Citrix, IBM, Google, Microsoft, Salesforce.com, and so on.

The cloud network 110 provides several different resources to users or subscribers, such as cloud storage 134 for storing files, documents, and other data, along with processor or compute resources in the form of accessible servers or CPUs 136. Any number of processors and storage devices may be allocated or accessible to a user typically for a subscription fee charged by the CSP 108. Much of the cost incurred by the user may be on a per usage basis, such that the user is charged for storage amounts used (e.g., Gigabytes or Terabytes of data per week or month) and for processing usage. In present public cloud environments, cloud storage 134 is typically relatively cheap in terms of dollar cost as compared to compute resources 136. For the embodiment of FIG. 1, cloud network 110 also provides access to application programs through a cloud-based office suite 132. Such programs can include word processors, drawing programs, databases, spreadsheet programs, and so on, as part of a unified product available from a vendor. One relevant example of such a suite is the Office365 suite available from Microsoft Corp. and supported on the Microsoft cloud network. Such a suite can be used to generate and process documents and files that need to be backed up for data protection using the backup management process 112. The backup storage media can implement any type of file, block or object-based storage, but embodiments are directed to object-based storage to make certain efficiencies more relevant.

As shown in FIG. 1, cloud network 110 may include cloud storage resources 134. In general, cloud storage is a model of data storage in which the data is stored in logical pools. The physical storage spans multiple servers, and the physical environment may be owned and managed by a hosting company 108 that keeps the data available and accessible, and the physical environment protected and running. The cloud storage 134 may be implemented as a hosted object storage service, but can also include other types of data storage that are available as a service, such as block storage.

A document backup to object store process 120 includes a data backup process that maintains all documents to be persisted in object storage. Unstructured data is often stored in cloud storage in a cloud object storage format or simply object storage format. Object storage architecture stores and manages data as objects compared to block storage, which handles data as blocks, and logical volumes and file storage which store data in hierarchical files, and is appropriate for cloud applications because it is elastic, flexible and it can more easily scale into multiple petabytes to support virtually unlimited data growth. Object storage is not particularly suitable for storage applications with high transactional rates, as it is generally not consistent enough for real-time systems such as transactional databases. For long-term or archival storage of large amounts of data, however, it offers significant advantages over block and file-based storage.

The object storage format includes a globally unique identifier for each object along with customizable metadata that is separated to enable other capabilities such as application and user-specific data for indexing. An object identifier is an address tied to the object, which enables the object to be found over a distributed system. Objects may be spread across multiple data centers and data can be found without the user knowing the specific physical location of the data. Object storage, along with the metadata, can be accessed directly via application program interfaces (APIs), HTTP and HTTPS. That differs from block storage volumes, which only can be accessed when they are attached to an operating system. In object storage systems, the data is bundled with the metadata tags and the unique identifier. These objects are stored in a flat address space, making it relatively easy to locate and retrieve the data. This flat address space storage thus helps eliminate the complexity and scalability challenges of hierarchical file system architectures.

In an embodiment, system 100 represents a Data Domain system that uses cloud object storage 134 as the target storage for the document data, such as documents generated by any suitable application, such as word processors, spreadsheet programs, presentation programs, and so on. Such applications may be part of a product suite, such as Office365, or similar. Such data intended to be protected by the usual deduplication processes executed by backup server 102. To ensure that data protection of documents is efficient from cost and performance perspectives, both storage media and processing (compute) costs must be considered in addition to solution simplicity. While any system must support restores, the performance of restoring documents and files is traded off for a cost reduction as restores occur with much less frequency than backups.

Public cloud providers generally support multiple tiers of storage, and there are often significant cost differences between tiers. As an example, Amazon Web Services (AWS) storage classes can differ in cost by a factor of five between the hottest and coldest tiers. Embodiments of the cost effective document backup process 112 helps meet all of the above criteria and supports a data tiering mechanism in which a user can control how aggressively the system tiers data among different storage media. This process requires minimal compute for the most common use case (backup) and instead of using complex, compute intensive data reduction methods such as deduplication, it achieves cost efficiency by moving data to lower cost object storage tiers.

Within its operating system and O365 product suite, Microsoft provides an API (known as the graphAPI) which is used to read and write documents to O365. It supports a rich set of APIs that support various methods for querying data which are used to retrieve full and incremental backup data in addition to write methods which are used to support restore operations. Other applications and product suites may offer similar API's, though for purposes of description, this API will be discussed, however embodiments are not so limited.

In an embodiment, an underlying data model stores all documents to be persisted in object storage. In addition, a metadata database (MDD) is used to maintain system metadata. There will be a single instance of this metadata database per end-user account. The MDD can be a lightweight portable database such as SQLite and will be persisted in object storage alongside with the O365 documents. SQLite is an example of a lightweight, portable database that is self-contained, and other similar databases that can be used.

With respect to the data model, in an embodiment, five different data structures are defined. There are four system metadata records, denoted as the Backup Record, the Container Record, the MultiPart record and the Document Record. The fifth data structure is the Container Data, which is the actual data record that holds the documents and selected metadata. The SQLite file will be persisted in object storage and will be loaded into compute memory during backup, restore or any other operation. Upon completion of any operation, the updated SQLite database will be written back to object store.

This data structure organization provides the following benefits: (1) efficient backup storage and workflow, (2) ability to track and manage tiering, (3) reduced metadata size, (4) easy identification of all unique versions of a file, (5) efficient file level and full recovery, and (6) protection and recovery of any size files.

In an embodiment, documents are grouped together into a Container Data (container) object which will hold up to 1024 documents and relevant metadata. Each container will be stored in an object store "bucket" located within a cloud account. Containers are write-once objects and will not be modified. The Document Record (DR) holds metadata and location information about each document and is used for document restores, listing, modification and delete operations. There is one DR record per document version. The MultiPart Record (MR) is a special record only used when a single document is larger than the size of a single container and therefore is split into multiple containers. The Container Record (CR) holds metadata and location information about each container. There is typically one CR record per Container Data (CD) object, and can be used to support data tiering. This record is global and shared by all backups. The Backup Record (BR) holds a pointer to a record that holds the container location, a bitmask (the valid mask or vmask) and the backup timestamp. There is one BR record per container for every backup PIT (point in time). This model enables efficient common operations such as creation/updating/deletion of a document, tiering of containers to lower cost storage and arbitrary (individual, partial, or all) document restores for any point in time.

It should be noted that a "partial" restore or delete means an operation on less than all documents in a set or saveset, however any document operation is atomic in that it restores or deletes a document in full. Performing a "partial" file restore could be implemented using a hashing technique (such as deduplication) to only send back portions of a file by comparing the hashes that are already on the destination with the hashes of the source (the version to restore from) and sending back only the differences (deltas).

In general, comprehensive data protection methods that use backup programs take a series of point-in-time (PIT) backup snapshots at defined periods, such as hourly, daily, weekly, and so on. These PIT backups allow the system to be restored to particular points in time depending on the backup frequency and time of data loss. Various different types of backup processes may be used, such as full, incremental, differential, and so on. Present backup methods for container-based systems typically involve creating or copying containers as part of the backup or recovery process. For example, a simple solution may create a different container for every PIT backup, while another may copy a container only when it is modified. Solutions requiring the creation or copying of containers, however, are generally expensive, as container creation is typically an I/O or resource intensive task. Embodiments of the document to object store process 120 using container-based storage eliminate this need to create, copy, or modify containers during the PIT backup/restore process thus reducing potentially expensive compute costs associated with cloud-based resources, FIG. 2 is a flowchart illustrating an overall method of providing optimized document storage to cloud-based object storage, under some embodiments. Process 200 of FIG. 2 begins in step 202 with creating a container for documents, where the container is a write-once object (due to the logic usage pattern) stored in an object store in the cloud network. As a write-once object, this container will not be modified, nor will it be copied or recreated as part of the data protection process for the documents (files) stored therein. Documents to be stored in the container are grouped together, 204. A document record is defined for each document, which includes a unique document ID (e.g., path/filename) and an index, 206. A backup record of the container is defined, which includes a backup timestamp and a bitmask for each document in the container, 208. This bitmask has a single bit position for document in the container and is called a valid mask or 'vmask,' where a set binary value indicates the corresponding document is valid (present) and null binary value indicates the document is invalid (not present). In step 210, the process sets the vmask to indicate documents in the container that are changed or deleted prior to a particular timestamped backup. The bits in the vmask are set to '1' for each valid document. When a container is created, all vmask bits are '1' for each document. In future backups where the same container is referenced, the vmask will be set to zero for deleted or changed documents.

Thus, for example, a container with five documents would have a five-bit vmask, such as 11011, which for this example means that documents 1, 2, 4, and 5 are valid, while document 3 is invalid for a backup at a particular timestamp. Each specific bit location in the vmask is referenced by the index in the document record.

The vmask and index structures are used to efficiently perform recovery and restore functions after the backup. As shown in FIG. 2, for a point-in-time recovery, the recovery process finds containers from the backup record that match a given timestamp, 212. The process then restores those documents in each container where the vmask bit is set, 214. The composition and interactions among these various data elements for the backup and restore processes will be provided in greater detail below.

A container is a write once data structure that holds a number of documents (such as 1024 documents) and the index simply refers to the position of a document in a container and is used in conjunction with the vmask. Each document record (DR) has an index number of where it exists in a container (1, 2, 3, 4, etc.), while the vmask is a bit mask where each position of the mask indicates if the document is valid per container for a given timestamp, where 'valid' means a document exists at that point in time. With respect to a containers, a document is added, deleted, or changed. An added document is marked as valid in the vmask, a deleted document is marked as invalid in the vmask, while a changed document is marked as deleted from the container at this point in time (bit set to 0 in vmask field of the BR record), and is added to a new container (new container vmask bit is set to 1). In this way, a container is not modified by a changed document, but instead, a new container is added to process this change through the vmask mechanism. For purpose of description, binary value 0 indicates valid and binary value 1 indicates invalid, but the opposite bit assignment can also be used.

As an example, in the case of an index value of 3 in the DR, the process would examine the third bit of the vmask in the BR. As per the example above, a vmask of 11011 indicates that documents at position (index) 1, 2, 4 and 5 are valid in the named container for the backup at the specified timestamp (the BR record), for example timestamp t6. Now, if the document at index 2 is deleted in a future backup, the BR vmask would be 10011 (vmask bit 2 is now zero) with the same container ID and a new later timestamp, for example timestamp t7. A restore operation at t6 would restore documents at indexes 1, 2, 4 and 5, while at t7, the restore operation would restore documents 1, 4 and 5. The DR record is not involved during full backup restores, it is only used during search, partial restores or to handle document deletion. For example, consider document ID (DRiD) 7483 is stored as document 2 in container 92. At t7, document id 7483 is deleted and therefore bit 2 in the vmask is changed from 1 to 0.

A document change is a delete followed by an add, so if at t7, document 7483 was changed then the delete operation above would be executed in addition to a new container (e.g. 97) being created that would hold the contents of the new version of 7483. The index of 7483 in container 97 may or may not be at index 2 (depending on the data stream). If the above change was the only change between t6 and t7, then the index of the new container 97 would be 1 because there is only one document in this container.

In an embodiment, documents or files that are large enough to require two or more containers are split or distributed among different containers for storage and the containers are referenced using a multi-part record associated with the document.

Figure 3:
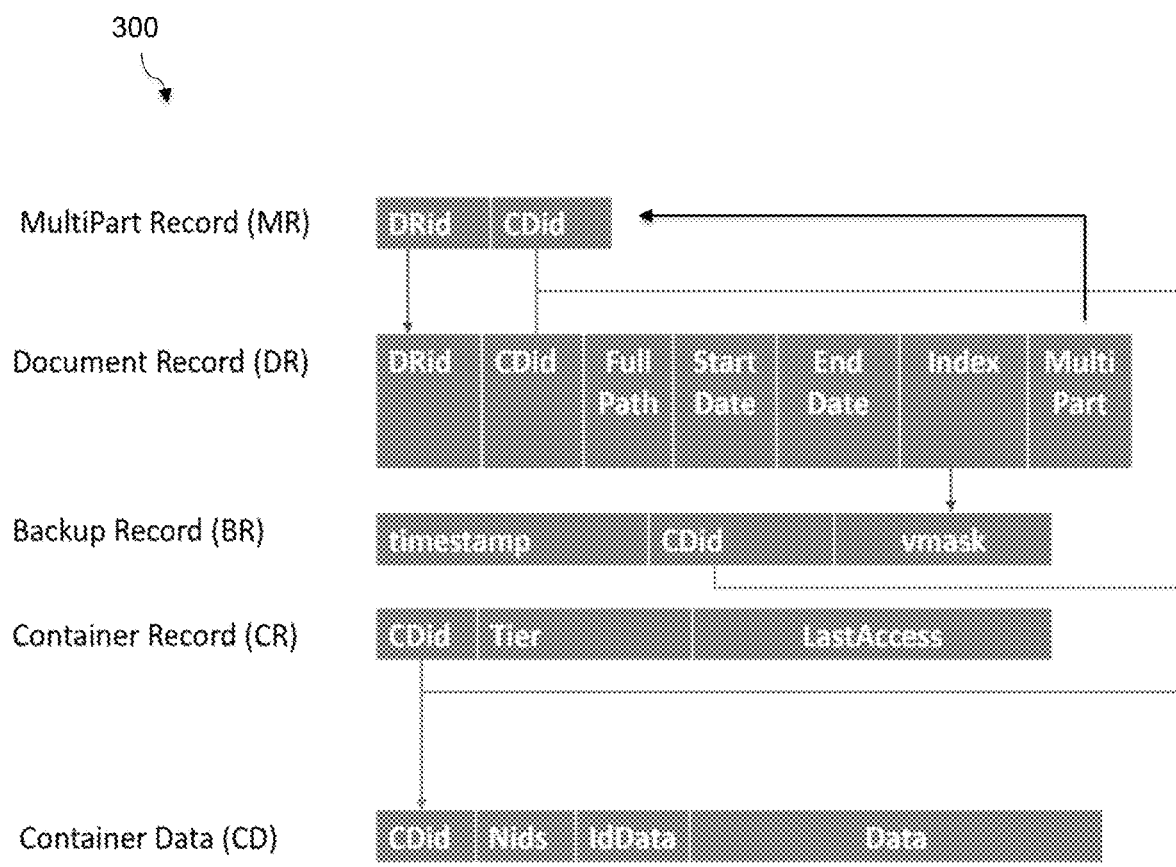
FIG. 3 is an entity-relationship diagram 300 of the MultiPart Record, Document Record, Backup Record, Container Record, and Container Data, under some embodiments.

FIG. 3 is an entity-relationship diagram 300 of the MultiPart Record, Document Record, Backup Record, Container Record, and Container Data, under some embodiments. The MR, DR, BR, and CR portions of data element 300 of FIG. 3 represents a metadata database, with one database per end user account and is packaged together and stored as a single object in the object store. Each user owns their own metadata database, and each document belongs to a specific user. The CD portion of 300 resides in the object store and is the actual data being protected.

As shown in FIG. 3, the MultiPart Record (MR), Document Record (DR), Backup Record (BR) and Container Record (CR) are data structures that reference the Container Data (CD) through linkages of different fields within their respective data structures. The data fields of each individual record (DR, BR, CR) and the CD will be discussed in greater detail below. Generally, the Container Data is indexed by the Document Record and an ID data field and the interactive data fields of the DR, BR, and CR records. These other records (MR, DR, BR and CR) are persisted in a single repository (e.g., SQLite, json, yaml, etc.) and this repository is stored in object store. This repository and associated containers are stored uniquely per user, no data is shared between users In an embodiment, the Container Data (CD) is stored as a single object in a particular object store bucket. It holds selected metadata and a compressed version of the data stream returned from the API (e.g., O365 API). It is written when created and only read during a restore operation. Containers can hold up to 1024 documents to maintains a balance between the size of a container and the number of containers required per backup. In an embodiment, the number of documents per container can be set by the user in a data tiering process described in greater detail below. An example format of the Container Data, such as shown in FIG. 3, may be as follows:

| Nids | IdData (offset, length) | Data |
| --- | --- | --- |

The process reads the data stream and breaks it into a series of containers. The Nids entry of the Container Data is the number of documents and the contents of the data stream per container. The Nids and IdData values are thus computed and stored per container. The IdData entry is absolute byte offset and length of each document in data stream (based on compressed data). The Data entry is a compressed stream of data from the graph API.

FIG. 4 is a table 400 that illustrates example entries of Container Data, under some embodiments. In FIG. 4, the Object Name is the object/file name of the container within a bucket and is not stored in the actual container. Each element in IdData represents a single document offset and length pair that maps to each document respectively within the data stream. The numbers in the Data field represent the document contents for each ID. The Office365 document ID is not stored separately in the container as it is already part of the data stream. In the example of FIG. 4, Document Id 1 is the first document in the data stream in john47.container-1 (offset=0) and is 22 bytes long, Document Id 32 is the second document in Container 2 at offset 82 with a length of 72 bytes, and so on. Document 51 is too large to be held in a single container and requires two containers (#4 and #5).

It should be noted that in FIG. 4 and other figures that IdData length values are simplified (reduced) values for illustrative purposes only. Embodiments are not limited to the example values shown, and any other data format, structure, length, and so on, may be used.

The Document Record (DR) of FIG. 3 holds metadata and location information about each document and is used for CRUD (create, read, update, delete) operations. There is one Document Record per document. An example format of the Document Record, such as shown in FIG. 3, may be as follows:

| DRid | CDid | Full Path | Start Date | End Date | Index | MultiPart |
| --- | --- | --- | --- | --- | --- | --- |

The DRid entry is a unique identifier that identifies a specific source path of a document. This entry uniquely identifies the document and can be made up of any alphanumeric string that encodes identifiers such as path/name/version, and so on. The graphAPI uses a unique ID for each file, and changes to a file contents or its source path (i.e., location) are reported using this ID. The DRid is supplied by the source application that creates/manages the document. It is possible that a source application could track (use the same DRid) event as it changes location. The CDid entry is the Container ID/object name within the bucket. The Full Path entry is the fully qualified path to the file being protected. The Start Date is the date when the version of the file was first created. The End Date is the last date when a version of the file existed in the named path. The MultiPart entry is a binary setting that indicates is the file split across multiple containers. If the file is multi-part (i.e., too large for a single container) this entry is set to true (i.e., '1') and the MR is then used to identify the two or more containers that the document is split or distributed among. The metadata database holds an MR for each container that a document is split among, so for a document spread among three containers there would be three MR records. The Index entry is the index into container where the document exists, and indicates whether, for the container, a version of the file is valid. This mechanism prevents the need to modify a container (which is processor intensive), but rather just update a metadata database.

The index within the Document Record indicates a specific bit position within the vmask of the Backup Record. This mechanism allows for the use of the same container for multiple points-in-time. Instead of generating new containers, this mechanism allows for simply writing a new Backup Record and changing bits in the vmask.

FIG. 5 is a table 500 that illustrates example entries of a Document Record, under some embodiments. The values shown are intended to be for example illustration only, and other values or formats may be used. For example, the ID entries are shown as integer values for example purposes only.

As per the Container Data description above, Document ID 33 is initially the third entry in container 1. The contents of this document start at byte offset 56 in the CD data segment and is 26 bytes long. In this example, it was moved on Jan. 3, 2012 to another folder and was therefore rewritten to end up in container 3 at index 2. Document moves are generally infrequent, so extra storage is consumed as opposed to a more complex data schema. A schema such as one that separates the file path from the contents would require more compute resources, which is expensive in the cloud and is sought to be avoided. The End Dates are left empty until a file is not valid. This is the case in the first version of Document 33 as a second version is generated as described above. In addition, document 14 was deleted on Jan. 2, 2012. It should be noted that the index is only 10 bits in length (max 1024 document per container) and can be held in a 16-bit short data type. The actual offset and length of each document are held directly in the container and will require up to 64 bits for the offset and 64 bit for the length. The offset and length are only required when the container is read (during a restore operation) and therefore are stored in the container IdData structure. As the DR will have the most rows in the SQLite database, this organization minimizes the size of the database which enables the processing to be more resource efficient. The realized efficiency will depend on the size of the ID used by the underlying system.

The MultiPart Record (MR) holds metadata and location information about each file that spans more than 1 container. As per the preceding example description, Document 51 requires two containers. An example format of the MultiPart Record, such as shown in FIG. 3, may be as below, which shows DR 51 as split between Container #4 and Container #5.

| DRid | CDid |
|------|------|
| 51   | 4    |
| 51   | 5    |

The Container Record (CR) holds metadata and location information about each container. There is one CR per container. If the cloud provider native tiering capabilities are not usable, then this record provides the data necessary for this invention to perform data tiering. An example format of the Container Data, as shown in FIG. 3, may be as follows:

| CDid | Tier | LastAccess |
|------|------|------------|

The CDid entry is the container ID/Object Name within the bucket. The Tier entry indicates whether the tier is hot, warm or cold. The LastAccess entry is a timestamp of container write (create) date or most recent read date. The goal is to tier data that has not be read as soon as possible in order to reduce storage costs. If the provider native tiering capabilities are insufficient, this field will be used as follows. The field is updated when a container is accessed (read) to support a restore operation. It is checked periodically (daily or weekly) to determine if the container should be tiered. There may be multiple tiering timeframes (e.g., 30 days for hot to warm, 90 days for warm to cold). The tiering of a container can be done in accordance with one or more data movement policies, such as based on an aging of the documents, such that older documents are moved first, or based on a set priority flag, user identity, or other marking mechanism. The number of tiers may be defined by the service or cloud provider and typically ranges from three tiers or more (e.g., AWS provides eight tiers).

If a container has been tiered out from the hot tier and a restore operation will require data from the container, the system will move the container back to the hot tier and then perform the restore. The restore operation may need to be delayed as moving a container back to the hot tier may not be an instantaneous operation. Whenever a container is read (e.g., during a restore), the timestamp will be updated to the current date.

FIG. 6 is a table 600 that illustrates example entries of a Container Record, under some embodiments. As shown in FIG. 6, typical entries for table 600 include the tier level (e.g., cold, warm, hot) in terms of last access time with hot tiers accessed most recently in terms of date or time, and cold or colder tiers accessed earlier. Other ranges are also possible using different scales, such as 1-5, new-medium-old-stale, and so on.

The Backup Record (BR) consists of a reference to a container, a bitmask and the backup timestamp. There is one BR per container for every backup point in time (PIT). An example format of the Backup Record (BR), as shown in FIG. 3, may be as follows:

| timestamp | vmask | Cid |
|-----------|-------|-----|

The Valid Mask (vmask) indicates which documents are valid in the container per backup. It will have a 1 bit set for each valid document and a 0 bit set for no valid document at the corresponding position. If a container is not full (i.e., less than 1024 documents), then the trailing bits will be set to 0 in order to indicate that there is no document at that relative position. For example, during a full backup, if a container only holds 1022 documents, the vmask will consist of 1022 '1' bits followed by two '0' bits. During an incremental backup any deleted (or modified) document will have its respective bit in the vmask set to '0'. The timestamp entry is the date of backup PIT. The CDid entry is the Container ID/Object Name within the bucket.

FIG. 7 is a table 700 that illustrates example entries of a Backup Record, under some embodiments. For the example of FIG. 7, at time t0, one container was created for the L0 backup, and container 1 has five documents. At time t1, four new documents were created and placed in container 2, and document 14 was deleted from container 1 (at index 3). At time t2, a modified (moved) version of document ID 33 (which is marked as invalid from container 1 at time t1) is written along with new file DRid 10 into container 3. Additionally, DRid 51 (which is a large file) is stored in containers 4 and 5.

Data Tiering Control

As stated previously, many cloud-based systems provide different levels of support and service in terms of system performance and cost. Generally, access to resources such as storage space and increased system performance in terms of bandwidth, computation speeds, media access speeds, and so on, can be determined by how much a user is willing to pay. As can be appreciated, greater performance and greater resource access usually costs more. Likewise, there may be times in which a user does not need a great deal of performance and would prefer to pay less or receive some sort of credit against usage.

In an embodiment process 120 provides a mechanism that allows a user to control data tiering so that they will have the ability to trade off cost for performance. Data tiering generally refers to moving data from one storage tier to another storage tier, where in-demand fast storage media is more expensive than widely available slow storage media. The most highly available (and most expensive) data tiers are those that can access data in the shortest period of time while the least available (and cheapest) data tiers have the slowest access time. The access times for various tiers can range from milliseconds to hours. Through a user interface, users can control their preference to optimize for cost or availability.

Figure 8:
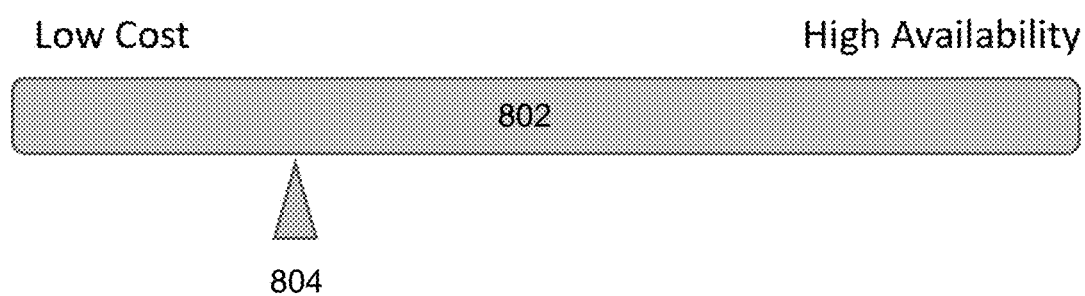
FIG. 8 illustrates an example user interface for controlling data tiering, under some embodiments.

FIG. 8 illustrates an example user interface for controlling data tiering, under some embodiments. For the embodiment of FIG. 8, a cost/availability range 802 is shown along an axis of lowest cost (cheap) media at one end to highest availability (expensive) media on the other end. A slider 804 is used to set the appropriate cost/availability balance for the user. The slider 804 setting will affect the number of documents stored in each Container Document and the tiering period. If the slider is on the side of low cost, then the number of documents stored in the Container Data object will be higher and the data tiering period will be shorter. This will allow more documents to be grouped together (which will reduce the amount of metadata) and the system will favor a shorter period between tiers. Conversely, if the slider is on the side of high availability, then the number of documents stored in the Container Data object will be lower and the data tiering period will be longer.

For example, if the slider is set at the Low Cost far end of the scale 802, each container will hold all documents per backup (up to the container limit) and the first level tiering period will be one day (or similar period); and if the slider is set to the far High Availability end of scale 802, each container will hold one document and the first level tiering period will be 30 days (or similar period).

The slider position of FIG. 8 dictates the size of the container (how many objects can be written to the container) and the frequency between the last access and the move to colder storage. The user can change tiering setting over time and this change does not negatively affect old data. For example, a user may initially select high availability, but change later to low cost if storage cost becomes an issue.

The user interface configuration of FIG. 8 is provided as an example of a graphical user interface allowing a user to set data tiering based on a balance between cost and availability of tiered storage media. Any other appropriate user interface representation can also be used, such as setting a numeric value within a range (e.g., between one and ten), manipulating a dial-based control), selecting a temperature setting (e.g., hot, warm, cold), or any other similar interface. Tiering may be defined by a system or backup administrator based on different classes of users, types of files, sources of files, or other characteristics.

In an embodiment, the user may also be able to select how documents are grouped or bulked together, such as by document type, age, creator, and so on. Different data tiering levels may then be selected for different groups of data. The grouping is primarily used to dictate how many documents are placed in a container to optimize the ability to tier a container sooner. For example, grouping fewer documents should allow faster tiering. For age grouping, the process can group documents together by specific or ranges of creation, modification or other relevant processing times.

Large Document Data Protection Process

In an embodiment, the overall process of protecting cloud-based documents, including large documents, involves storing documents, performing the backup (full or incremental), recovering individual documents, and/or performing full Point-in-Time recovery operations, as well as other processes, such as data tiering and garbage collection.

Figure 9:
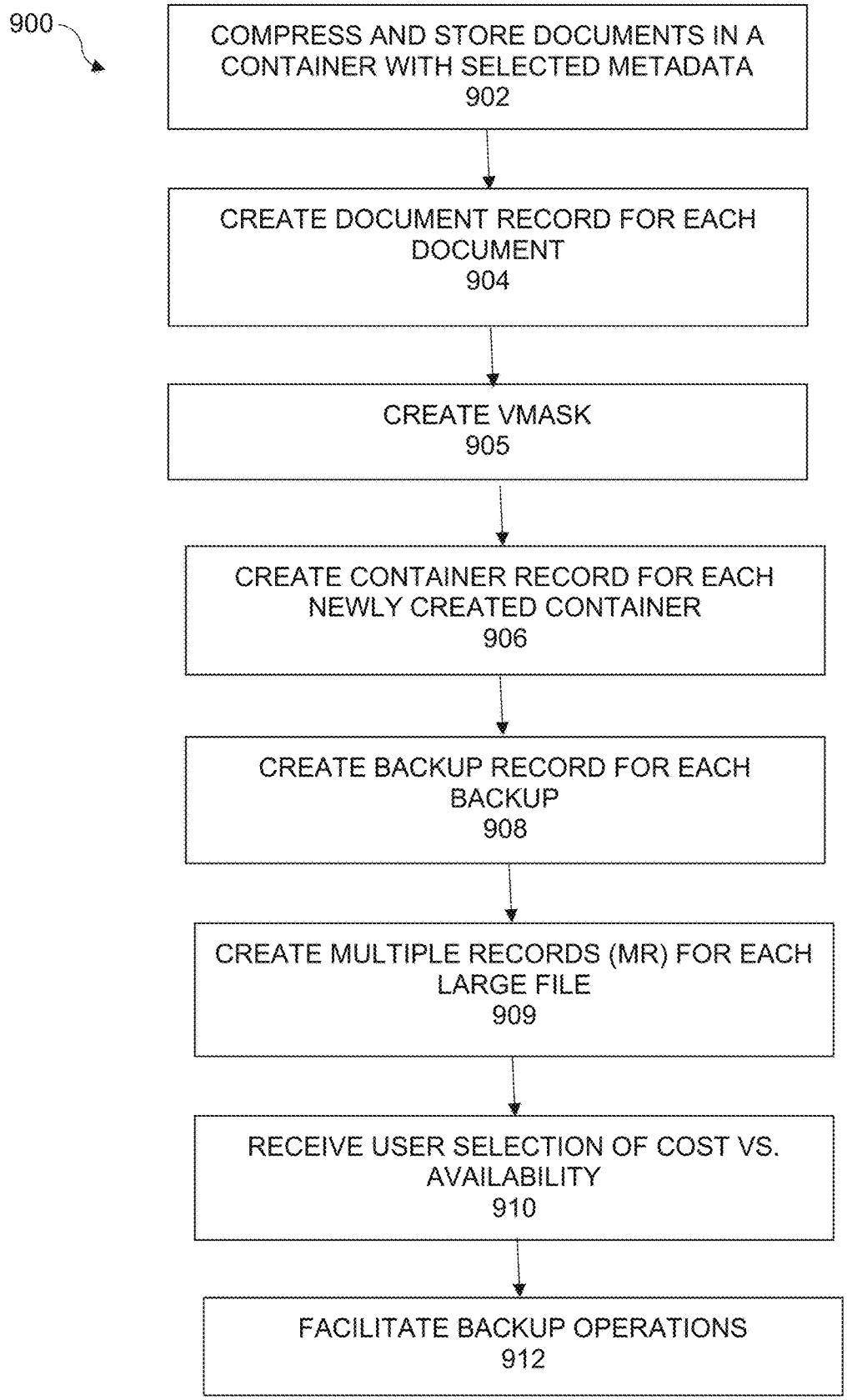
FIG. 9 is a flowchart that illustrates a method of backing up large documents to an object store, under some embodiments.

FIG. 9 is a flowchart that illustrates a method of backing up large documents to an object store, under some embodiments. With respect to storing documents, documents are first compressed and stored in a container along with selected metadata, 902. In an embodiment, each container may be configured to hold up to 1024 documents. A Document Record (DR) will then be created for each document, 904. A valid mask (vmask) bitmap structure is next built by setting a bit to '1' for every document created, 905.

A Container Record (CR) is created for each newly created container, 906, and the vmask is built while documents are placed in the container. A Backup Record (BR) is created for each container for each backup, 908. In step 909, Multiple Records (MR) entries are created for each large file, with one MR per container.

For the embodiment in which a user can dictate data tiering based on a selection of cost versus availability (as shown in FIG. 8), the process 900 receives this user selection through the appropriate user interface, 910. Once the required records are created and the user selection is received, the process facilitates the execution of backup operations, 912, such as full or incremental backups of the stored documents.

In order to backup documents for an application, the backup process will initially perform a full backup. This involves performing a full query against the graphAPI. This API will return the current state of the document box, which is a list of all documents. These documents will be stored as previously described. A number, N, containers will be created, which is as many as needed to satisfy the number of documents to be stored. The system metadata records will be created and inserted into the SQLite DB.

Incremental backup data will be retrieved from Office365 by requesting the changes from the prior full or incremental backup point in time. Each incremental backup consists of a series of documents deleted, added, and changed. Initially a copy of the Backup Record records from the previous point in time will be made and the timestamp will be changed to reflect the current incremental time. One minor optimization would be to only copy the BR when changes to a container between backups is made, which would reduce backup and possibly restore times due to less metadata being created or read.

Deleted (actual or synthetic) documents will set the appropriate DR record End Date (where the End Date is null) for the document ID to the previous point in time. Next, using CDid and index from this updated DR record, the newly created BR that refers to CDid will have its vmask at bit index set to '0'. The new version of this document will be in a new container and the vmask will be set to 1 in the BR for this new container. Changed documents will be processed as a synthetic document delete from a present container followed by a document add in a new container.

With respect to finding documents, the data model described herein provides an efficient search mechanism for one of common search use cases. Such a use case is where the filename is specified (fully or partially qualified) and optionally the start and/or end date are also provided. This search is fully resolved by performing a simple lookup on solely the DR (Document Record). Furthermore, by performing a secondary query using the DRid, all tracked versions of each resulting file can be shown which will include results from cases where the file was moved and/or renamed This enables of depth of file identification typically not available in present solutions. Recovery of any (or all) entries from this list is a simple process as each result above is identified by a unique DR record that contains the CDid and index which is all that is required for file recovery. For example, embodiments of process 120 can track a document based on document ID regardless of changes or moves. A document that may have its name changed from "x.doc" to "y.doc" (such as file change or movement) will retain the same DRid, and can thus be accurately tracked and processed as the same file, versus present systems that deal only with files based on their file name. This allows for efficient partial or selective backup and restore operations of a few or even single files, as opposed to entire data sets. It also allows extraction of all versions of a file including when a file may have been moved, renamed, or versioned multiple times and among multiple users.

To perform a full point-in-time recovery from a given timestamp, the system simply finds all the containers from the BR record that matches the given timestamp. Then, from each container, the system performs a restore of every document in each container where the appropriate vmask bit in the BR record is one.

For data tiering, the process uses the Container Record, which is configured to support data tiering. The last access timestamp in the Container Record is updated when a container is created or when a new backup refers to an existing container. When containers are created, they are placed in highly available storage (hot). Containers that have not been referenced for a period of time (e.g., 30 days) are moved down to a warm tier and those not referenced for a set period of time (e.g., 90 days) are moved to the cold tier. Accessing data from a cold tier may require special workflows and therefore containers are moved on a scheduled basis. The actual tiers and times to move a container will depend on the complexity and economics of a specific cloud infrastructure. It should be noted certain cloud environments, such as AWS (Amazon Web Services) and Azure have automatic data tiering capabilities. Depending on the infrastructure and economic, the use of automatic vs. performing manual tiering can be evaluated.

With respect to garbage collection (GC) processes, removing unused containers can be performed in an efficient manner. Containers that are unused will have all of their vmask bits set to 0 for every Backup Record that refers to the Container Id. These can be easily be found by performing a simple query against the Backup Record. This enables a straightforward solution to garbage collection processes. Basically, any container in which the vmask goes from any non-zero value to 0 indicates that the container can be removed by the GC process. Thus, any non-zero value to all zero value is a candidate for removal. If a vmask is all zero and all valid (non-expired) backups also have the vmask all zero for a specific container, only then can the container be removed.

Although embodiments are described with respect to storing large documents in object storage, it should be noted that documents or files of any size, type, and composition may be supported. Such documents can be created by applications such as those from the Office365 suite or any other appropriate application program. For example, files or documents on the order of gigabyte (GB) or terabyte (TB) size are supported.

Embodiments of the document to object store process described herein take advantage of the economics of the public cloud by relying on minimal compute (i.e., no expensive deduplication processing) and instead relies on more storage consumption which is less expensive even when stored in the highest of availability tiers. It thus provides advantages over existing technologies such as on-premise deduplication systems that reside on a fixed hardware platform with limited access data tiering capabilities, and in which the compute cost is a sunk cost. Embodiment uniquely use a bitmap to provide a highly efficient storage model to indicate the valid/invalid documents within a container for any Point-in-Time backup or GC process, and enables a level of file version tracking across backups, which is generally not available in similar solutions. The process keeps the compute costs low for the typical workflows (backup) by relying on low cost object storage with data tiering as opposed to using complex, resource intensive method such as deduplication. It also includes a novel approach to data tiering where the user can control how the system bulks together data and how aggressively data is down-tiered to manage cost and availability.

System Implementation

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 10:
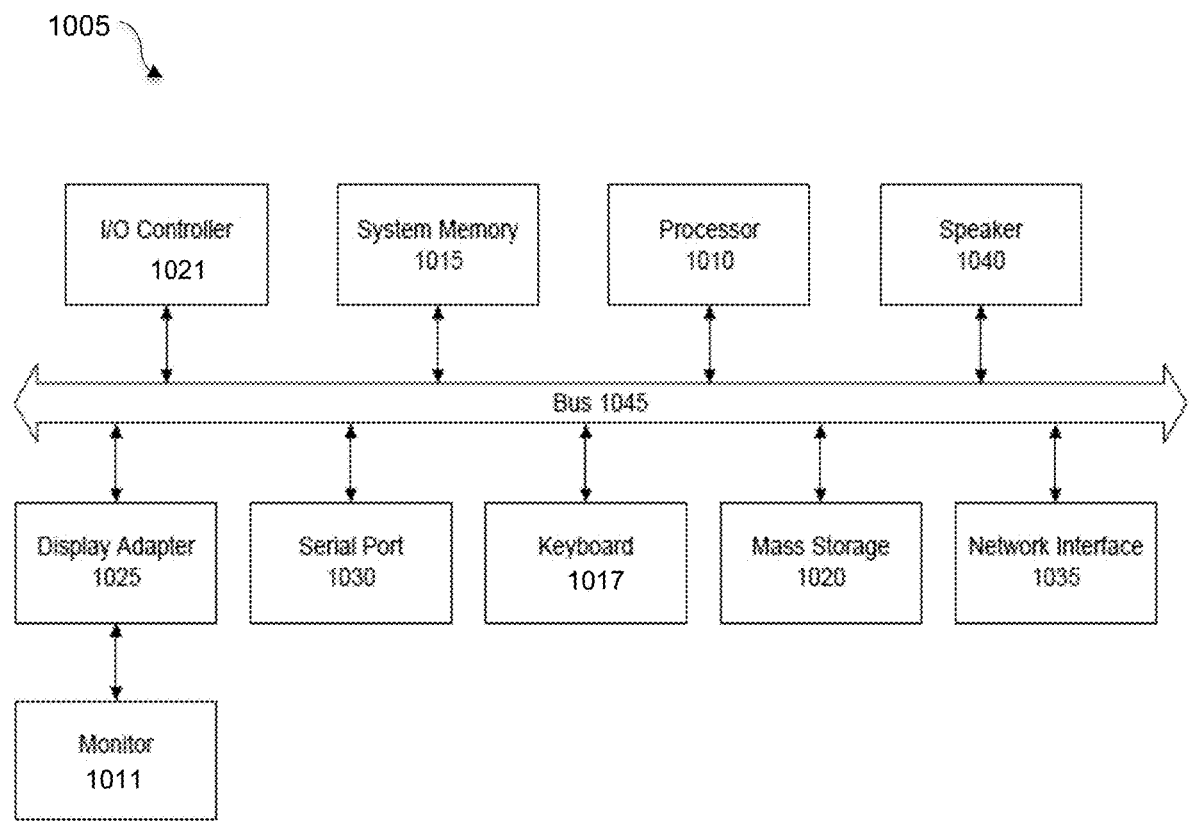
FIG. 10 is a system block diagram of a computer system used to execute one or more software components of a document to object store process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 10 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of storing documents in an object store of a cloud network, comprising:
   creating a container for the documents;
   defining a document record for each document, which includes a unique document ID and an index;
   defining a backup record of the container for every backup in a series of backups, which includes a timestamp for each backup, and a bitmask for each document in the container, wherein the bitmask has a single bit position for each document in the container which is set to a first binary value to indicate that the corresponding document is unchanged and a second binary value indicates the document is changed or deleted for a backup;
   referencing each specific bit location in each bitmask by the index in each document record;
   finding, during a point-in-time recovery operation, containers from a backup record that matches a given timestamp; and
   restoring documents in each container where a bitmask bit for a respective document is set to the first binary value.

2. The method of claim 1 wherein the created container is a write-once object that will not be modified or copied as part of a data protection process for any documents stored therein.

3. The method of claim 1 wherein the documents include a large document too large to be stored in a single container, the method further comprising:
   splitting the large document for storage in two or more containers;
   referencing each of the two or more containers using a multi-part record associated with the large document.

4. The method of claim 3 wherein document record for each document of the documents comprises a unique document record ID (DRid) specifying a version, source path and file name of a respective document, a container ID of the container, a start date indicating document creation time, an end date specifying the last date the version of the document existed in the source path, the index, and the multi-part record.

5. The method of claim 4 wherein the series of backups for each container comprises a full backup followed by a plurality of incremental backups, and wherein, during the full backup, a number of containers including the container are created to store all of documents owned by a user, and wherein each incremental backup retrieves respective incremental backup data by requesting changes from a prior full or incremental backup point-in-time with each incremental backup comprising a series of documents modified, deleted, or added after the prior full or incremental backup.

6. The method of claim 5 further comprising:
   setting, for deleted documents, a document record end date for the document ID to a previous backup point in time;
   setting to the first binary value, a document ID bitmask at each bit location referenced by the index for an updated document record; and
   processing changed documents as a synthetic document delete followed by a document add by marking a corresponding bit in a bitmask for a current container to invalid, creating a new container for each changed document of the changed documents, adding changed documents in respective new containers, and setting a corresponding bit in a bitmask for the new container to valid.

7. The method of claim 1 wherein the series of backups comprise point-in-time backups consisting of snapshots of the documents at each corresponding timestamp, and wherein the cloud network is maintained by a cloud service provider, and provided for long term retention of the documents and the object store comprises a plurality of data tiers based on storage cost versus availability.

8. The method of claim 7 further comprising providing a user interface allowing selection of a storage tier for storage of the documents and wherein the selection, if set for low cost will cause the number of documents stored in each container to be higher and a data tiering period to be shorter to allow more documents to be grouped together and result in a shorter period between data tiers.

9. The method of claim 1 further comprising performing a garbage collection process to remove unused containers by finding containers with all of their respective bitmask values set to the second binary value through a query operation on respective backup records of each container of the containers.

10. A method of protecting documents comprising:
storing the documents in a container of a plurality of containers along with selected metadata;
creating a Document Record for each document of the documents, wherein the Document Record includes a unique document ID for each document and an index;
creating a Container Record for each container configured to be a write once object, and hold a defined number of documents;
defining a backup record for each container for every backup in a series of backups, which includes a timestamp for each backup, and a bitmask for each document in the container and referenced by the index;
splitting a large document too large to be stored in a single container into multiple parts for storage in two or more containers; and
referencing each of the two or more containers using a multi-part record associated with the large document.

11. The method of claim 10 wherein each bitmask has a single bit position for each document in the container which is set to a first binary value to indicate that the corresponding document is unchanged and a second binary value indicates the corresponding document is changed or deleted for a backup, and wherein each specific bit location in each bitmask is referenced by each index.

12. The method of claim 11 wherein each series of backups comprises a full backup followed by a plurality of incremental backups, and wherein, during the full backup, a number of containers including the container are created to store all documents owned by a user, and wherein each incremental backup retrieves respective incremental backup data by requesting changes from a prior full or incremental backup point-in-time with each incremental backup comprising a series of documents modified, deleted, or added after the prior full or incremental backup.

13. The method of claim 12 further comprising:
setting, for deleted documents, a document record end date for the document ID to a previous backup point in time;
setting to the first binary value, a document ID bitmask at each bit location referenced by the index for an updated document record; and
processing changed documents as a synthetic document delete followed by a document add.

14. The method of claim 13 further comprising:
finding, during a point-in-time recovery operation, containers from a backup record that matches a given timestamp; and
restoring documents in each container where an appropriate bitmask bit is set to the first binary value.

15. The method of claim 10 wherein each container is a write-once object stored in an object store of a cloud computing network, the method further comprising:
creating system metadata records for each container; and
storing the system metadata records in a lightweight, portable database in the object store.

16. The method of claim 15 wherein the cloud network is maintained by a cloud service provider, and provided for long term retention of documents and the object store comprises a plurality of data tiers based on storage cost versus availability, the method of claim further comprising providing a user interface allowing selection of a storage tier for storage of the document and wherein the selection, if set for low cost will cause a number of documents stored in a container to be higher and a data tiering period to be shorter to allow more documents to be grouped together and result in a shorter period between data tiers.

17. The method of claim 16 further comprising using each Container Record to move documents to lower cost storage of the data tiers by:
updating a last access timestamp for a container when the container is created or referenced in a new backup operation;
placing new or most recently created containers in higher cost storage; and
moving containers from higher cost storage to the lower cost storage in accordance with one or more data movement policies, wherein the data tiers comprise hot, warm, and cold tiers of storage from highest cost to lowest cost storage, and wherein the one or more data movement policies comprise an age of a document in days.

18. The method of claim 10 further comprising performing a garbage collection process to remove unused containers by finding containers with all of their respective bitmask values set to the second binary value through a query operation on respective backup records of each container of the containers.

* * * * *